United States Patent
Ku et al.

(10) Patent No.: US 9,606,791 B2
(45) Date of Patent: Mar. 28, 2017

(54) CONTROLLED METHOD AND APPARATUS TO SECURELY INSTALL AND UPDATE SOFTWARE

(71) Applicant: TENCENT TECHNOLOGY (SHENZHEN) COMPANY LIMITED, Shenzhen (CN)

(72) Inventors: Yu Ku, Shenzhen (CN); Yamin Wei, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 433 days.

(21) Appl. No.: 14/187,792

(22) Filed: Feb. 24, 2014

(65) Prior Publication Data

US 2014/0173578 A1 Jun. 19, 2014

Related U.S. Application Data

(63) Continuation-in-part of application No. PCT/CN2012/078356, filed on Jul. 9, 2012.

(30) Foreign Application Priority Data

Aug. 23, 2011 (CN) .......................... 2011 1 0243128

(51) Int. Cl.
G06F 9/44 (2006.01)
G06F 9/445 (2006.01)

(52) U.S. Cl.
CPC . *G06F 8/67* (2013.01); *G06F 8/65* (2013.01)

(58) Field of Classification Search
None
See application file for complete search history.

(56) References Cited

U.S. PATENT DOCUMENTS 5,732,275 A * 3/1998 Kullick et al. ................ 717/170
6,282,709 B1 * 8/2001 Reha et al. .................... 717/175

(Continued)

FOREIGN PATENT DOCUMENTS

| CN | 1904837 A | 1/2007 |
| CN | 1979418 A | 6/2007 |

(Continued)

OTHER PUBLICATIONS

International Search Report issued Oct. 18, 2012; re: PCT/CN2012/078356.

(Continued)

*Primary Examiner* — Adam Lee
(74) *Attorney, Agent, or Firm* — Cantor Colburn LLP (57) ABSTRACT

A method and an apparatus for installing and updating software are provided. The method includes: establishing a first directory corresponding to a current version of software in a pre-defined directory, placing a resource file of the current version of the software in the first directory; searching the pre-defined directory for a directory corresponding to a latest version of the software when a main program of the software is started, and loading the directory corresponding to the latest version of the software; downloading and installing a new version of the software when the software is running, establishing a second directory corresponding to the new version of the software in a directory where a directory corresponding to an old version of the software is stored, and placing a resource file of the new version of the software into the second directory. The apparatus includes: an initial installing module, a main program file and an update process module. Various embodiments of the present disclosure implement quiet update of software, reduce the amount of human-machine interactions during an update process, and make the software easier to use by users.

13 Claims, 7 Drawing Sheets

(56) References Cited

U.S. PATENT DOCUMENTS

| | | | |
|---|---|---|---|
| 6,912,711 B1* | 6/2005 | Curtis et al. | 717/173 |
| 7,814,476 B2* | 10/2010 | Ho | 717/169 |
| 8,490,081 B2* | 7/2013 | Moon et al. | 717/174 |
| 2005/0055686 A1* | 3/2005 | Buban et al. | 717/170 |
| 2006/0265708 A1 | 11/2006 | Blanding et al. | |
| 2007/0113225 A1 | 5/2007 | Felts | |
| 2010/0180271 A1* | 7/2010 | Arsenault et al. | 717/168 |
| 2012/0246630 A1* | 9/2012 | Kuzins et al. | 717/169 |

FOREIGN PATENT DOCUMENTS

| | | |
|---|---|---|
| CN | 101859250 A | 10/2010 |
| WO | 2010130734 A1 | 11/2010 |

OTHER PUBLICATIONS

Chinese Office Action issued Dec. 31, 2014 re: Application No. 201110243128.7.

International Preliminary Report on Patentability issued Mar. 6, 2014 and Written Opinion issued Oct. 18, 2012 re: Application No. PCT/CN2012/078356.

\* cited by examiner

CONTROLLED METHOD AND APPARATUS TO SECURELY INSTALL AND UPDATE SOFTWARE

RELATED DOCUMENT INFORMATION

This application is a continuation-in-part application of pending International Application PCT/CN2012/078356, filed on Jul. 9, 2012, which claims priority to Chinese Patent Application 201110243128.7, filed on Aug. 23, 2011, all of which are incorporated by reference in their entireties to the extent there is no inconsistency with the present disclosure.

TECHNICAL FIELD

The present disclosure relates to software techniques in a data processing device, and particularly to a method and an apparatus for installing and updating software.

BACKGROUND

Computer software has been integrated with the Internet over the past dozens of years. Open and cooperation have become a trend of the Internet technology. The future Internet will not only take in more information, but also share and provide more information. A more open platform will provide Internet users with brand new experiences. With users' habits keeping changing, software updates becoming more frequent, new functions keeping replacing the old at a faster pace, software is required to have strong updating capabilities to better satisfy the demands of users.

SUMMARY

This section provides a general summary of the disclosure, and is not a comprehensive disclosure of its full scope or all of its features.

Various embodiments of the present disclosure provide a method and an apparatus for installing and updating software to implement quiet update of software, reduce the amount of human-machine interactions during update, and make it easier for users to use the software.

Compared with the conventional art, the technical scheme provided by various embodiments of the present disclosure places a resource file of each version of software into a directory corresponding to the version, and all the directories are placed into the same directory as an executable file of the software. The executable file of the software searches for a directory corresponding to a latest version in the directory where the executable file is stored, and loads the directory corresponding to the latest version. Therefore, various embodiments implement auto update and installation without requiring a user using the software to quit the software. The user is kept unaware of the update process when using the software. After the update is completed, the user is able to directly use the updated software when the user starts the software the next time. As such, quiet update of the software is realized, the amount of human-machine interactions is reduced, and the user can use the software more easily.

Further areas of applicability will become apparent from the description provided herein. The description and specific examples in this summary are intended for purposes of illustration only and are not intended to limit the scope of the present disclosure.

BRIEF DESCRIPTION OF THE DRAWINGS

Features of the present disclosure are illustrated by way of example and not limited in the following figure(s), in which like numerals indicate like elements, in which.

DETAILED DESCRIPTIONS

For simplicity and illustrative purposes, the present disclosure is described by referring mainly to an example thereof. In the following description, numerous specific details are set forth in order to provide a thorough understanding of the present disclosure. It will be readily apparent however, that the present disclosure may be practiced without limitation to these specific details. In other instances, some methods and structures have not been described in detail so as not to unnecessarily obscure the present disclosure. As used herein, the term "includes" means includes but not limited to, the term "including" means including but not limited to. The term "based on" means based at least in part on. In addition, the terms "a" and "an" are intended to denote at least one of a particular element.

Reference throughout this specification to "one embodiment," "an embodiment," "specific embodiment," or the like in the singular or plural means that one or more particular features, structures, or characteristics described in connection with an embodiment is included in at least one embodiment of the present disclosure. Thus, the appearances of the phrases "in one embodiment" or "in an embodiment," "in a specific embodiment," or the like in the singular or plural in various places throughout this specification are not necessarily all referring to the same embodiment. Furthermore, the particular features, structures, or characteristics may be combined in any suitable manner in one or more embodiments.

Conventional manners of installing and updating computer desktop software generally store a file of a main program (e.g., a file in .exe format) into the same directory with resource files, e.g., .dll files that is to be loaded. This makes the resource files, e.g., the dll fits, more quickly found because Windows operating systems will by default first load the directory where the .exe file is stored. Update of the software generally requires a user to quit the current main program (.exe file) before downloading and installing an updated software package. Then the user can use the updated functions by re-starting the software.

The conventional manners of installing and updating software not only require excessive human-machine interactions but also interrupt the user's usage of the current version of software.

The technical scheme is applicable not only to software installed into a personal computer, but also to software installed into various data processing devices (e.g., a smart phone, a tablet computer and the like).

Figure 1:
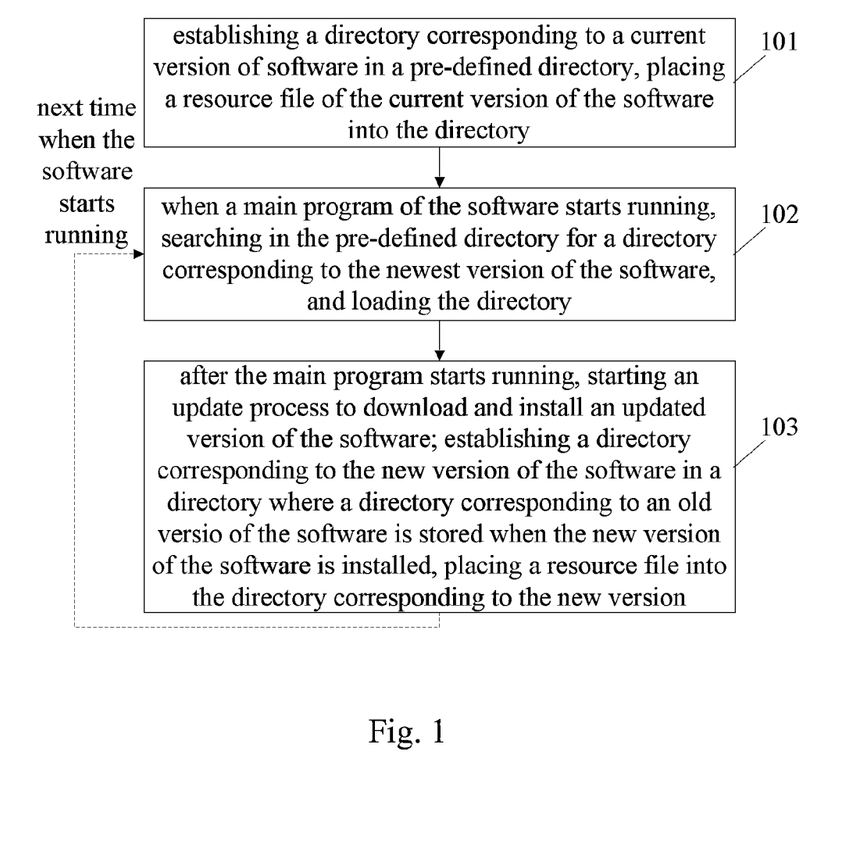
FIG. 1 is a flowchart illustrating a method for installing and updating software according to an embodiment of the present disclosure.

FIG. 1 is a flowchart illustrating a method for installing and updating software according to an embodiment of the present disclosure. Referring to FIG. 1, the method may include the following procedures.

In block 101, a directory is established for a current version of a piece of software in a pre-defined directory, and a resource file of the current version of the software is placed into the directory.

In an embodiment, the procedure in this block may be executed when the software is initially installed in a device.

In block 102, the pre-defined directory is searched to find a directory corresponding to a latest version of the software when a main program (e.g., a main exe program in a personal computer) of the software starts running, and the directory corresponding to the latest version is loaded.

In block 103, an update process is started to download and install an updated version of the software when the main program of the software is running, a second directory corresponding to the new version of the software is established in the directory where a directory corresponding to an old version of the software is stored (i.e., the pre-defined directory) when the new version of the software is installed, and a resource file of the new version of the software is stored into the second directory.

The update process may be started by the main program when the main program is started, or be started by the main program after a time delay, e.g., after the main program has been running for a pre-defined period of time. For example, the main program may start a timer after being started, and starts the update process when the timer expires.

The update process may automatically be terminated after the download and installation of the updated software are completed, thus will not have impact on the running of the main program. The next time when the main program is started, the main program may search in the pre-defined directory to find a directory corresponding to a latest (newest) version of the software and load the directory to run the latest version. Thus, the user is able to view updated software functions, and is unaware of the update process which is transparent to the user.

In an embodiment, the pre-defined directory may be the directory where the main program of the software is stored, or a directory at another hierarchy, e.g., the parent directory or a sub directory of the directory where the main program is stored, and so on.

In an embodiment, the pre-defined directory may be the directory where the main program of the software is stored. The following provides a more detailed description to the technical scheme.

Figure 2:
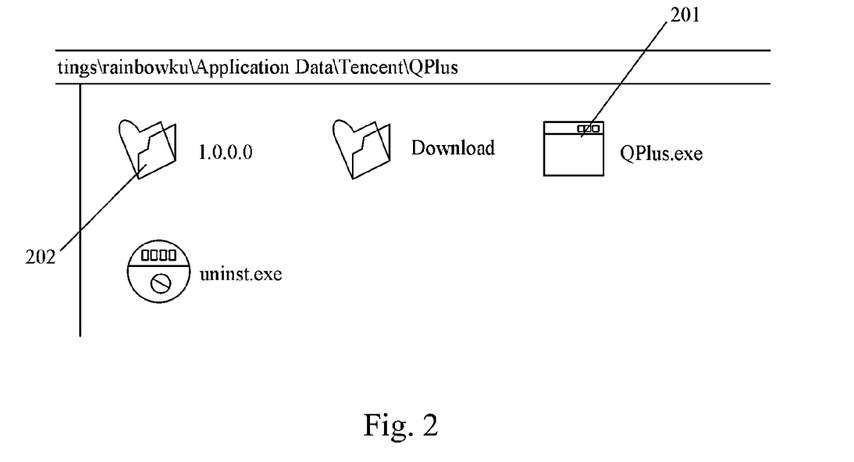
FIG. 2 is a schematic diagram illustrating composition of a directory at the time when a piece of software is initially installed according to an embodiment of the present disclosure.

FIG. 2 is a schematic diagram illustrating composition of a directory at the time of initial installation of a piece of software according to an embodiment of the present disclosure. From FIG. 2 it can be seen that the directory where the software is installed has a different structure from that in the conventional art. According to the conventional art, the main program, i.e., an exe file, is generally stored in the same directory with a resource file, e.g., a .dll file that is to be loaded. According to an embodiment of the present disclosure, the exe file of the main program is stored in a parent directory of the directory where a resource file is stored. In the embodiment as shown in FIG. 2, the exe file 201 of the main program is stored in a root directory of the software, and resource files to be loaded, e.g., .dll files, are all stored in a directory 202 corresponding to a current version of the software. The directory 202 is in the same directory as the exe file 201 of the main program, e.g., the root directory as in this embodiment. The exe file 201 of the main program is actually just a shell, and is for searching for a directory of the most up-to-date version of the software in the directory where the exe file 201 is stored and loading the directory.

Figure 3:
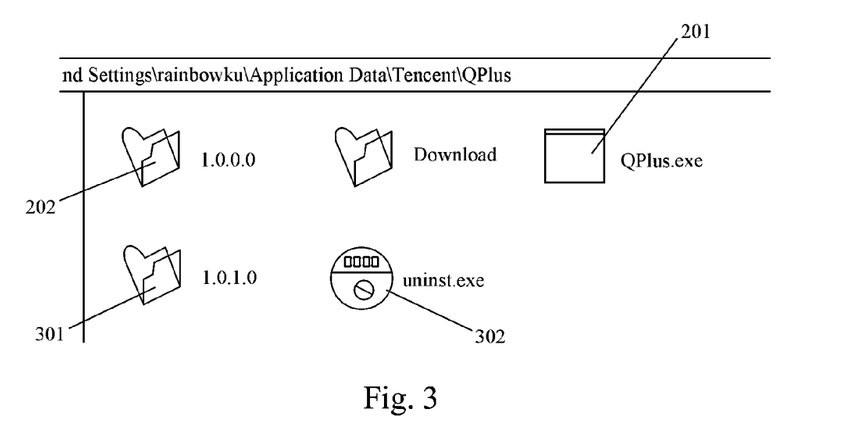
FIG. 3 is a schematic diagram illustrating composition of a directory after installation of an updated version of the software according to an embodiment of the present disclosure.

FIG. 3 is a schematic diagram illustrating composition of a directory after installation of an updated version of software according to an embodiment of the present disclosure.

Referring to FIG. 3, after the updated software is downloaded and installed according to an embodiment of the present disclosure, the updated software (generally in form of a package of updated software) is de-compressed in the directory where the software is installed with all resource files stored in a directory 301 corresponding to the new version of the software. The location of the exe file 201 of the main program and the directory 202 corresponding to an old version remains unchanged. Therefore, the update has no impact on the running main program. Next time when the user starts the main program, the directory corresponding to the latest version is automatically loaded to run the latest version of the software.

Various embodiments change the directory for storing the file of the main program, the operating system may search for the file according to an order defined in the operating system. Windows provides an application program interface (API) via which the order of searching for .dll resource files to be loaded by an application. The API is:

BOOL WINAPI SetDllDirectory(LPCTSTR lpPathName)

The main program of the software may use the API to make the operating system successfully load the resource file without changing the order of searching in directories for .dll files after the file of the main program is stored in a parent directory of the directory where the main program was supposed to be stored.

According to the present disclosure, after the software has been updated for several times, there may be multiple directories respectively corresponding to the multiple versions of the software in the directory where the user installed the software and in the pre-defined directory (if the pre-defined directory is not the directory where the main program is stored) in order to implement the quiet update of the software. One conventional uninstallation process is corresponding to one installation process of the desktop software. For example, with respect to an installation package produced by using the Microsoft Software Installation (MSI) tool, an uninstallation process of the software can only uninstall a directory where the version to be uninstalled of the software is installed. Thus, the conventional uninstallation process can not completely and tracelessly remove the whole software. Therefore, various embodiments of the present invention re-design the uninstallation program by using the Nullsoft Scriptable Install System (NSIS) script to control the uninstallation of software. As shown in FIG. 3, the uninstallation program 302 is for completely removing a software. The NSIS is an installation program supporting script under Windows, is free, open source, supports script, and can control any detail in an installation process by using customized scripts. The uninstallation program 302 generated by using the NSIS may be included in a main installation package. When the uninstallation program 302 is started, the uninstallation process of the software begins. The uninstallation may include removing all files and directories in the pre-defined directory and in the directory where the file 201 of the main program is stored, i.e., removing all the files and directories in the root directory where the QPlus.exe file is stored. As such, the whole software (including various versions of the software) is tracelessly removed. The uninstallation program does not have to be updated in subsequent updates of the software once the software has been installed, thus the maintenance cost of the uninstallation program is reduced to zero.

Figure 4:
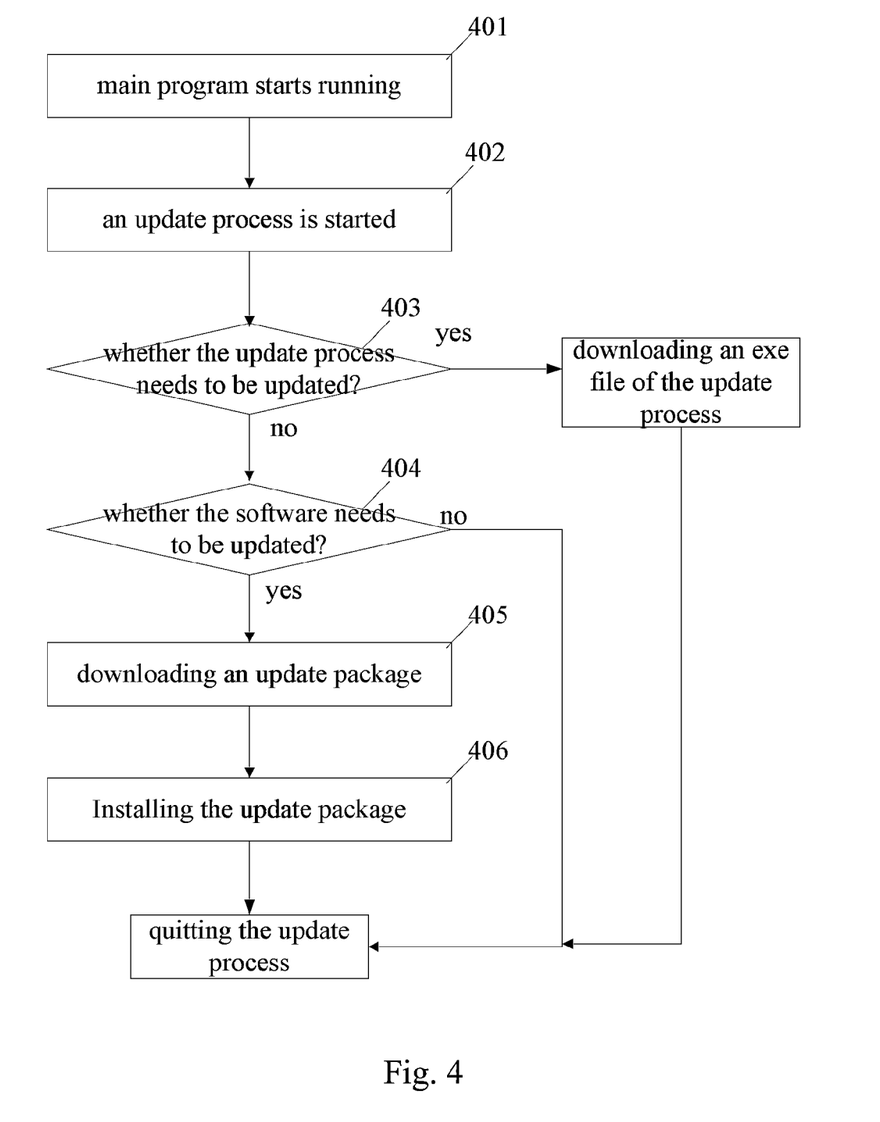
FIG. 4 is a flowchart illustrating an update process according to an embodiment of the present invention.

FIG. 4 is a flowchart illustrating an update process according to an embodiment of the present invention. As shown in FIG. 4, the process may include the following procedures.

In block 401, a main program is started and starts running.

In block 402, the main program starts an update process.

Since the update process involves multiple interactions with an update server, control over the frequency of inquiry is needed to minimize the amount of requests sent by a client to the server. In an embodiment, before the update process is started, i.e., before block 402, the method may further include: judging whether at least two instances of the main program of the software are running in the system, and starting the update process by using one of the running instances of the main program (e.g., the first instance) in response to a determination that at least two instances are running in the system, or starting the update process by using an instance of the main program in response to a determination that the instance is the only instance of the main program running in the system. As such, the multiple instances are prevented from initiating respective update inquiries, thus the frequency of update inquiries is controlled and the amount of requests sent by a client to the server is reduced.

In block 403, after being started, the update process first checks whether the update process needs to be updates, i.e., the update process may interact with the server to determine whether the update process is to be updated, that is, judging whether the server has a program file corresponding to a new version of the update process which is more up-to-date than the version of the update process in the local machine, downloads an exe file of the new version of the update process in response to a determination that there is a new version in the server, and terminates the update process; the procedure in block 404 is performed in response to a determination that the server does not have a new version of the update process which is more up-to-date than the version of the update process in the local machine. The procedure in block 403 is optional. An embodiment may skip the block 403 and directly execute block 404.

In block 404, the update process interacts with the server to determine whether there is the need of updating the software, i.e., judging whether there is a more up-to-date version of the software in the server, and the procedure in block 405 is performed in response to a determination that there is a new version of the software in the server, or the update process is terminated in response to a determination that the server does not have a new version of the software.

In block 405, the new version of the software is downloaded. In various embodiments, the updated software is in the form of an updated software package, thus the updated software package of the new version may be downloaded.

In block 406, the updated software package is installed, a directory corresponding to the new version of the software is established in the directory where a directory corresponding to an old version of the software is stored, a resource file of the new version of the software is placed into the directory corresponding to the new version, and the update process is terminated.

Since the updated software package belongs to sensitive data, after the updated software package is downloaded and before the updated software package is installed, i.e., between block 405 and block 406, an embodiment may further include: judging whether the downloaded updated software package matches with an MD5 value, and performing subsequent processing in response to a determination that the downloaded updated software package matches with the MD5 value; or determining the download is failed in response to a determination that the downloaded updated software package does not match with the MD5 value, deleting the downloaded updated software package, trying to download the updated software package again; terminating the download process in response to a determination that the number of failed downloads reaches a pre-defined value (e.g., it may be defined that the download may be failed for at most 3 times), and terminating the update process.

The MD5 value is generated by a server for verifying whether a software package is genuine or has not been modified for vicious purposes. The update process may obtain the MD5 value of the new version of the software from the server. The MD5 value is then used in verifying the downloaded updated software package.

Figure 5:
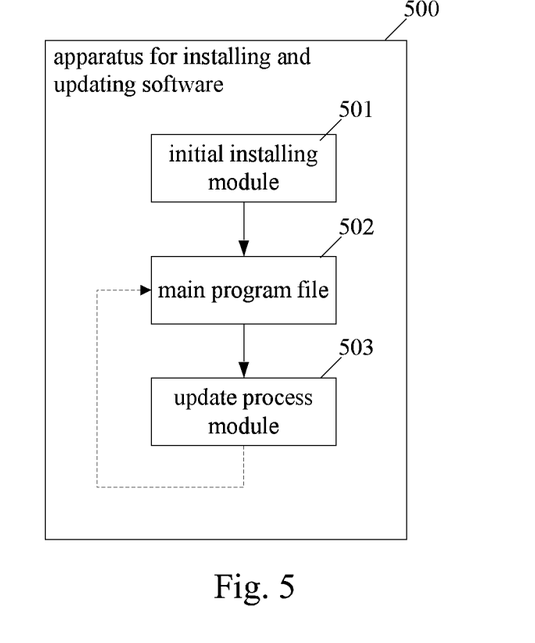
FIG. 5 is a schematic diagram illustrating a structure of an apparatus for installing and updating software according to an embodiment of the present invention.

Corresponding to the above method, various embodiments of the present disclosure also provide an apparatus for installing and updating software. FIG. 5 is a schematic diagram illustrating a structure of an apparatus for installing and updating software according to an embodiment of the present invention. As shown in FIG. 5, the apparatus 500 may includes the following components.

An initial installing module 501 establishes a first directory for a current version of software in a pre-defined directory when the software is initially installed, places a resource file of the current version of the software into the first directory. The first directory is as shown in FIG. 2.

A main program file 502 starts running a main program of the software, searches in the pre-defined directory for a directory corresponding to a latest version of the software when the main program starts running, and load the directory.

An update process module 503 starts miming when the software is running, downloads and installs a new version of the software after being started, establishes a second directory corresponding to the new version of the software in the directory where a directory corresponding to an old version of the software is stored when the new version of the software is installed, and places a resource file of the updated version of the software into the second directory.

Figure 6:
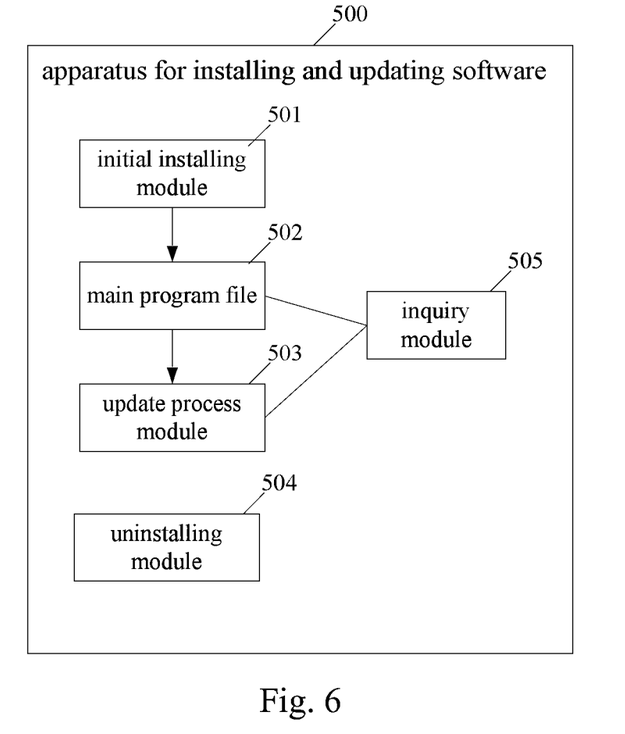
FIG. 6 is a schematic diagram illustrating a structure of an apparatus for installing and updating software according to an embodiment of the present invention.

FIG. 6 is a schematic diagram illustrating a structure of an apparatus for installing and updating software according to an embodiment of the present invention. As shown in FIG. 6, in order to remove the whole software (including all of the versions) completely and tracelessly, the apparatus may further include an uninstalling module 504 for removing all files and directories in the pre-defined directory and in the directory where the main program file is stored. In order to reduce the amount of requests sent by a client to a server, the apparatus may further include an inquiry module 505 for judging whether at least two instances of the main program of the software are miming in the system, and starting the update process module 503 by using one of the running instances of the main program (e.g., the first instance) in response to a determination that at least two instances are running in the system, or starting the update process module 503 by using an instance of the main program in response to a determination that the instance is the only instance of the main program running in the system.

Figure 7:
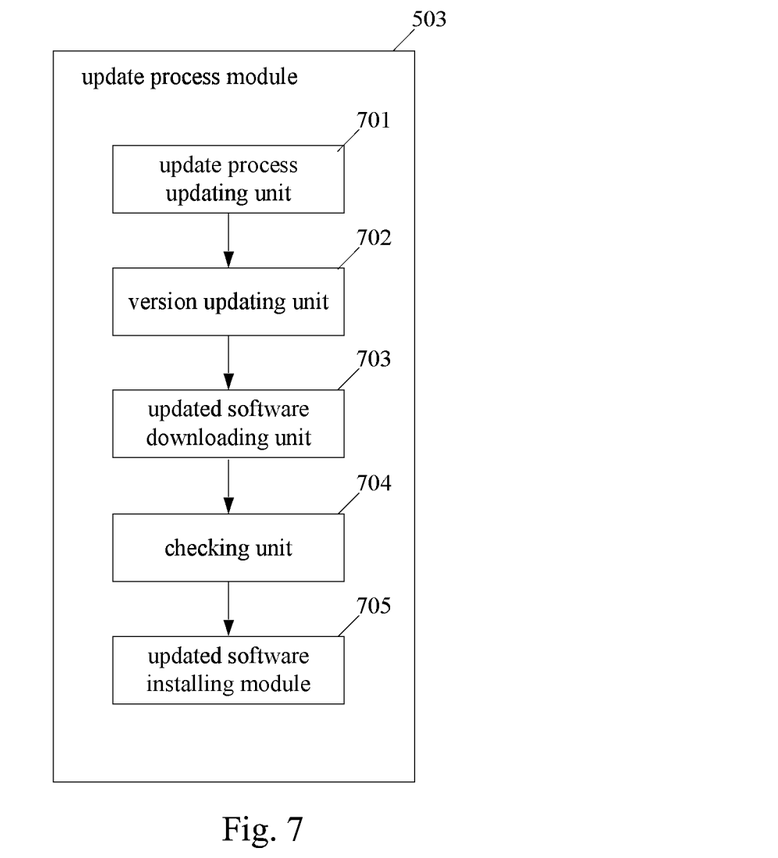
FIG. 7 is a schematic diagram illustrating a structure of an update process module according to an embodiment of the present disclosure.

FIG. 7 is a schematic diagram illustrating a structure of an update processing module according to an embodiment of the present disclosure. As shown in FIG. 7, the update process module 503 may include the following components.

An update process updating unit 701 interacts with a server to judge whether the update process is to be updated before the updated software is downloaded, downloads a file for a new version of the update process and terminates the update process in response to a determination that the update process is to be updated, or triggers the update process module to download and install the updated software in response to a determination that the update process is not to be updated.

A version updating unit 702 interacts with the server before the updated software is downloaded to judges whether the software is to be updated, starts the process of downloading and installing an updated software package of a new version of the software in response to a determination that the software is to be updated; or terminates the update process in response to a determination that the software is not to be updated.

An updated software downloading unit 703 downloads the updated software package for the new version of the software from the server.

A checking unit 704 judging whether the downloaded updated software package matches with an MD5 value after the updated software package is downloaded and before the updated software package is installed, triggers the updated software installing unit to install the updated software package in response to a determination that the downloaded updated software package matches with the MD5 value, or deletes the downloaded updated software package and triggers the updated software downloading module to download the updated software package again in response to a determination that the downloaded updated software package does not match with the MD5 value, and terminates the update process in response to a determination that the number of failed downloads has reached a pre-defined value (e.g., it may be defined that the download may be failed for at most 3 times).

An updated software installing unit 706 installs the downloaded updated software package, establishes the second directory corresponding to the new version of the software in the directory where a directory corresponding to an old version of the software is stored when the new version of the software is installed, and places a resource file of the new version of the software into the second directory.

The update process updating unit 701 and the checking unit 704 are optional, may be adopted or omitted in various embodiments.

Figure 8:
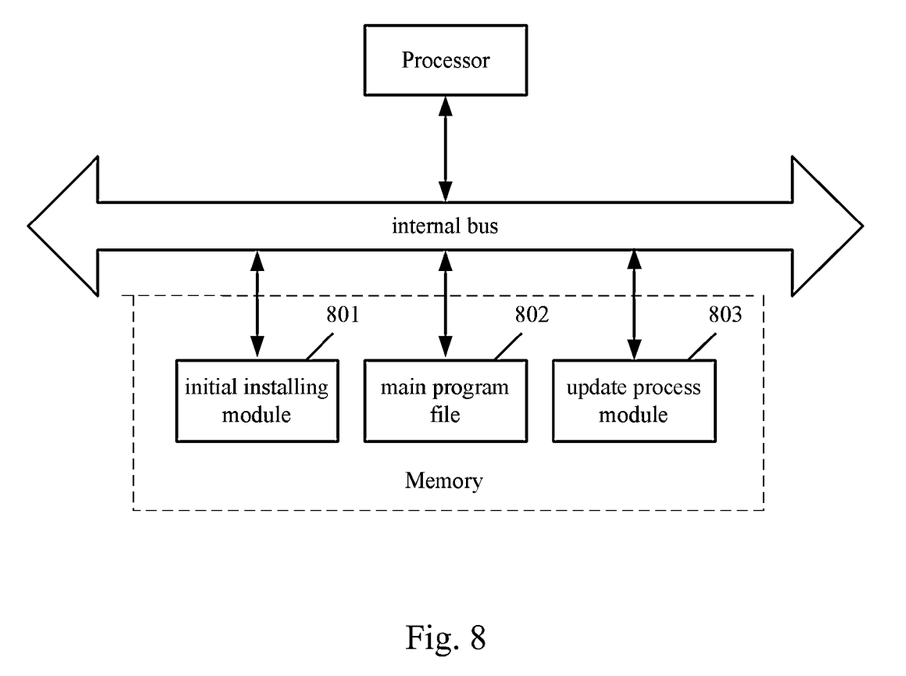
FIG. 8 is a schematic diagram illustrating a structure of an apparatus for installing and updating software according to an embodiment of the present invention.

FIG. 8 is a schematic diagram illustrating a structure of an apparatus for installing and updating software according to an embodiment of the present invention. As shown in FIG. 8, the apparatus may include a processor, a memory and an internal bus. The memory may include: an initial installing module 801, a main program file 802, an update process module 803.

Modules 801, 802 and 803 include machine-readable instructions that may cause the processor to implement functions of modules 501, 502 and 503.

In various embodiments, a hardware module may be implemented mechanically or electronically. For example, a hardware module may comprise dedicated circuitry or logic that is permanently configured (e.g., as a special-purpose processor, such as a field programmable gate array (FPGA) or an application-specific integrated circuit (ASIC)) to perform certain operations. A hardware module may also comprise programmable logic or circuitry (e.g., as encompassed within a general-purpose processor or other programmable processor) that is temporarily configured by software to perform certain operations. It will be appreciated that the decision to implement a hardware module mechanically, in dedicated and permanently configured circuitry, or in temporarily configured circuitry (e.g., configured by software) may be driven by cost and time considerations.

Various embodiments of the present disclosure may be implemented by program codes executable by a data processing device, e.g., a computer. The program codes are part of the technical scheme. Program codes stored in a storage medium may be executed by being read from the storage medium or being installed or copied into a storage device (e.g., a hard drive and/or memory) in a data process device. Thus, the storage medium is also part of the technical scheme. The storage medium may include paper storage medium (e.g., paper-tape and etc.), magnetic storage medium (e.g., floppy disk, hard drive, Flash card and etc.), optical storage medium (e.g., CD-ROM, and the like), magneto-optical storage medium (e.g., MO and the like) and so on.

A machine-readable storage medium, e.g., a non-transitory machine-readable storage medium, is also provided, which is to store instructions to cause a machine to execute any of the embodiments as disclosed herein.

Various embodiments effectively reduce operation and maintenance costs for updating the software and provide capabilities such as self-updating of the update process and so on by adopting the special file deployment and control over the update process.

The technical scheme is especially applicable to desktop open software which has conventional installation and uninstallation functions so that the desktop open software implements quick and quiet update by combining individual characteristics of the software with the technical scheme provided, thus the desktop open software can satisfy further demands of users for software installation and uninstallation. The desktop open software refers to an open platform which allows third-party vendors to provide services for users of the open platform. The quiet update functions provided by various embodiments enable users to experience the latest functions of software in use without having to go through the complex process of updating the software, and can make the desktop open software easier to use.

The scope of the claims should not be limited by the embodiments set forth in the examples, but should be given the broadest interpretation consistent with the description as a whole.

The invention claimed is:

1. A method for installing and updating software, comprising:
    establishing, within a pre-defined directory, a first directory for a current version of the software;
    placing a resource file of the current version of the software into the first directory;
    searching in the pre-defined directory for a directory containing a latest version of the software when a main program of the software is started;

loading the directory containing the latest version of the software;

starting an update process to download and install the latest version of the software when the main program of the software is running;

establishing a second directory in the pre-defined directory; and placing a resource file of the latest version of the software into the second directory;

wherein the method further comprises: after the update process is started and before the latest version of the software is downloaded, interacting with a server to determine whether the update process is to be updated, downloading a file for a new version of the update process and terminating the update process in response to a determination that the update process is to be updated; or continuing the update process to download and install the latest version of the software in response to a determination that the update process is not to be updated.

2. The method of claim 1, further comprising: deleting all files and directories in the pre-defined directory and in a directory where a file of the main program is stored when the software is uninstalled.

3. The method of claim 1, wherein the pre-defined directory is the directory where the file of the main program is stored.

4. The method of claim 1, further comprising: before the update process is started, judging whether there are at least two instances of the main program running in a current system, starting the update process by using one of the at least two instances in response to a determination that at least two instances of the main program are running in the system; or starting the update process by using an instance of the main program in response to a determination that the instance is the only instance of the main program running in the system.

5. The method of claim 1, further comprising: before the latest version of the software is downloaded, interacting with the server to determine whether the current version of the software is to be updated, performing the step of downloading and installing the latest version of the software in response to a determination that the current version of the software is to be updated, or terminating the update process in response to a determination that the current version of the software is not to be updated.

6. The method of claim 1, further comprising: after the latest version of the software is downloaded and before the latest version of the software is installed, judging whether the downloaded latest version of the software matches with an MD5 value, performing the step of installing the latest version of the software in response to a determination that the downloaded latest version of the software matches with the MD5 value, or determining the download is failed and deleting the downloaded latest version of the software in response to a determination that the downloaded latest version of the software does not match with the MD5 value, and terminating the download process in response to a determination that a number of failed downloads has reached a defined value.

7. An apparatus for installing and updating software, comprising:

a microprocessor;

an initial installing module, to establish within a pre-defined directory, using the microprocessor, a first directory for a current version of the software when the software is initially installed and place a resource file of the current version of the software into the first directory;

a main program file, to start running a main program of the software using the microprocessor, search in the pre-defined directory for a directory containing a latest version of the software when the main program starts running, and load the directory containing the latest version of the software; and an update process module, to start running, using the microprocessor when the main program of the software is running, an update process to download and install the latest version of the software, establish a second directory in the pre-defined directory, and place a resource file of the latest version of the software into the second directory;

wherein the update process module comprises an update process updating unit, to interact with a server to determine whether the update process is to be updated after the update process is started and before the latest version of the software is downloaded, download a file for a new version of the update process and terminate the update process in response to a determination that the update process is to be updated; or make the update process module continue the update process to download and install the latest version of the software in response to a determination that the update process is not to be updated.

8. The apparatus of claim 7, further comprising: an uninstall module, to delete all files and directories in the pre-defined directory and in a directory where a file of the main program is stored when the software is uninstalled.

9. The apparatus of claim 7, wherein an initial installing module establishes the first directory for the current version of software in the directory where the file of the main program is stored.

10. The apparatus of claim 7, further comprising: an inquiry module, to judge whether there are at least two instances of the main program running in a current system before the update process is started, start the update process by using one of the at least two instances in response to a determination that at least two instances of the main program are running; or start the update process by using an instance of the main program in response to a determination that the instance is the only instance of the main program running in the system.

11. The apparatus of claim 7, wherein the update process module comprises: a version updating unit, to interact with the server to determine whether the current version of the software is to be updated before the latest version of the software is downloaded, download and install the latest version of the software in response to a determination that the current version of the software is to be updated, or terminating the update process in response to a determination that the current version of the software is not to be updated.

12. The apparatus of claim 7, wherein the update process module comprises: a checking unit, to judge whether the downloaded latest version of the software matches with an MD5 value after the latest version of the software is downloaded and before the latest version of the software is installed, trigger the update process module to perform the step of installing the latest version of the software in response to a determination that the downloaded latest version of the software matches with the MD5 value, or determine the download is failed and delete the downloaded latest version of the software in response to a determination that the downloaded latest version of the software does not match with the MD5 value, and terminate the download process in response to a determination that a number of failed downloads has reached a defined value.

13. A non-transitory storage medium, storing data processing instructions to cause a machine to execute the method of claim 1.

* * * * *